(12) United States Patent
Kruse et al.

(10) Patent No.: US 11,570,255 B2
(45) Date of Patent: Jan. 31, 2023

(54) SMB2 SCALEOUT

(71) Applicant: Microsoft Technology Licensing, LLC, Redmond, WA (US)

(72) Inventors: David M. Kruse, Kirkland, WA (US); Daniel E. Lovinger, Seattle, WA (US); Thomas E. Jolly, Redmond, WA (US); James T. Pinkerton, Sammamish, WA (US); Mathew George, Bellevue, WA (US); Roopesh C. Battepati, Sammamish, WA (US); Mingdong Shang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/806,369

(22) Filed: Mar. 2, 2020

(65) Prior Publication Data

US 2020/0204633 A1 Jun. 25, 2020

Related U.S. Application Data

(60) Continuation of application No. 14/834,959, filed on Aug. 25, 2015, now Pat. No. 10,630,781, which is a
(Continued)

(51) Int. Cl.
*H04L 67/141* (2022.01)
*H04L 67/1038* (2022.01)
(Continued)

(52) U.S. Cl.
CPC .......... *H04L 67/141* (2013.01); *H04L 67/10* (2013.01); *H04L 67/1014* (2013.01);
(Continued)

(58) Field of Classification Search
CPC .............. H04L 67/1097; H04L 67/148; H04L 67/1014; H04L 67/141; H04L 69/14; H04L 67/10; H04L 67/1038
See application file for complete search history.

(56) References Cited

U.S. PATENT DOCUMENTS

| 7,562,129 B1 * | 7/2009 | Lee ........................ H04L 67/306 |
| | | 709/219 |
| 7,685,312 B1 * | 3/2010 | Caronni .................. H04L 67/51 |
| | | 709/215 |

(Continued)

OTHER PUBLICATIONS

"Office Action Issued in Korean Patent Application No. 10-2013-7034797", dated Jun. 13, 2019, 5 Pages.
(Continued)

*Primary Examiner* — Jonathan A Bui
*Assistant Examiner* — Kidest Mendaye

(57) ABSTRACT

Systems and methods are disclosed for clients and servers operating in a scaled cluster environment. Efficiencies are introduced to the process of connecting a client to a clustered environment by providing the client with the ability to attempt a connection with multiple servers in parallel. Servers operating the in the clustered environment are also capable of providing persistent storage of file handles and other state information. Ownership of the state information and persistent handles may be transferred between servers, thereby providing clients with the opportunity to move from one server to another while maintaining access to resources in the clustered environment.

19 Claims, 6 Drawing Sheets

Related U.S. Application Data division of application No. 13/228,818, filed on Sep. 9, 2011, now abandoned.

(51) Int. Cl.
  *H04L 67/148* (2022.01)
  *H04L 67/1097* (2022.01)
  *H04L 69/14* (2022.01)
  *H04L 67/1014* (2022.01)
  *H04L 67/10* (2022.01)

(52) U.S. Cl.
  CPC ...... *H04L 67/1038* (2013.01); *H04L 67/1097* (2013.01); *H04L 67/148* (2013.01); *H04L 69/14* (2013.01)

(56) References Cited

U.S. PATENT DOCUMENTS

| | | | | |
|---|---|---|---|---|
| 2002/0073211 | A1* | 6/2002 | Lin | H04L 67/02 709/229 |
| 2003/0033412 | A1* | 2/2003 | Sundaresan | H04L 29/06 709/227 |
| 2005/0228884 | A1* | 10/2005 | Hawley | H04L 67/1002 709/225 |
| 2006/0047751 | A1* | 3/2006 | Chen | H04L 47/125 709/205 |
| 2006/0224764 | A1 | 10/2006 | Shinohara et al. | |
| 2008/0155552 | A1* | 6/2008 | Kim | G06F 9/5083 718/105 |
| 2009/0222582 | A1* | 9/2009 | Josefsberg | H04L 41/0654 709/245 |
| 2009/0222583 | A1* | 9/2009 | Josefsberg | H04L 67/1038 709/245 |
| 2011/0280247 | A1* | 11/2011 | Roskind | H04L 69/163 370/401 |

OTHER PUBLICATIONS

"Office Action Issued in Chinese Patent Application No. 201610207685.6", dated Jul. 16, 2020, 14 Pages.
"Notice on Reexamination Issued in Chinese Patent Application No. 201610207685.6", dated Jan. 9, 2020, 7 Pages.
"Examination Report Issued in Indian Patent Application No. 1686/CHENP/2014", dated Dec. 27, 2019, 7 Pages.
"Examination Report Issued in Indian Patent Application No. 1748/CHENP/2014", dated Dec. 30, 2019, 6 Pages.

* cited by examiner

SMB2 SCALEOUT

CROSS-REFERENCE TO RELATED APPLICATIONS

This application is a continuation of U.S. patent application Ser. No. 14/834,959, filed Aug. 25, 2015, entitled "SMB2 SCALEOUT," which application is a division of U.S. patent application Ser. No. 13/228,818 know abandoned), filed on Sep. 9, 2011, entitled "SMB2 SCALE-OUT," which are hereby incorporated by reference in their entirety. To the extent appropriate, Applicant claims priority to each of the above-referenced applications.

BACKGROUND

Server clusters are commonly used to provide failover and high availability of information to clients. Traditionally, cluster environments are designed according to a client-server protocol in which a client connects to server in order to access resources available to the server. In traditional clustered environments, different servers that compose the environment may access different file systems. The inability to access a common file system restricts the functionality of a traditional file system cluster.

It is with respect to these and other considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Embodiments of the present disclosure provide a scaled out clustered environment where a files system may be logically clustered such that each node in the cluster has access to all resources that reside in the cluster. Because the file system is accessible to each node in the clustered environment, a client can access the cluster's resources regardless of which node the client connects to. Such an environment provides a client with options when connecting to the clustered environment. The client may leverage the flexibility of the scaled cluster node to efficiently connect to the server cluster.

In other embodiments, while the scaled clustered environment allows the clients to access resources across the cluster regardless of the actual node that the client establishes a connection with, once the client establishes a connection with a node it attempts to maintain its connection with the same node in order to reduce the amount of state information that is transferred between then nodes of the clustered environment.

However, in some instances a client may not be able to maintain a connection with the same node, but is required to connect to a different node in the scaled clustered environment. In further environments, the scaled cluster environment provides for the storage and maintenance of session information, state information, and or handle's in order to facilitate a client's movement from one node to another. The cluster's nodes are able to communicate such information between one another to facilitate the movement of client connections.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
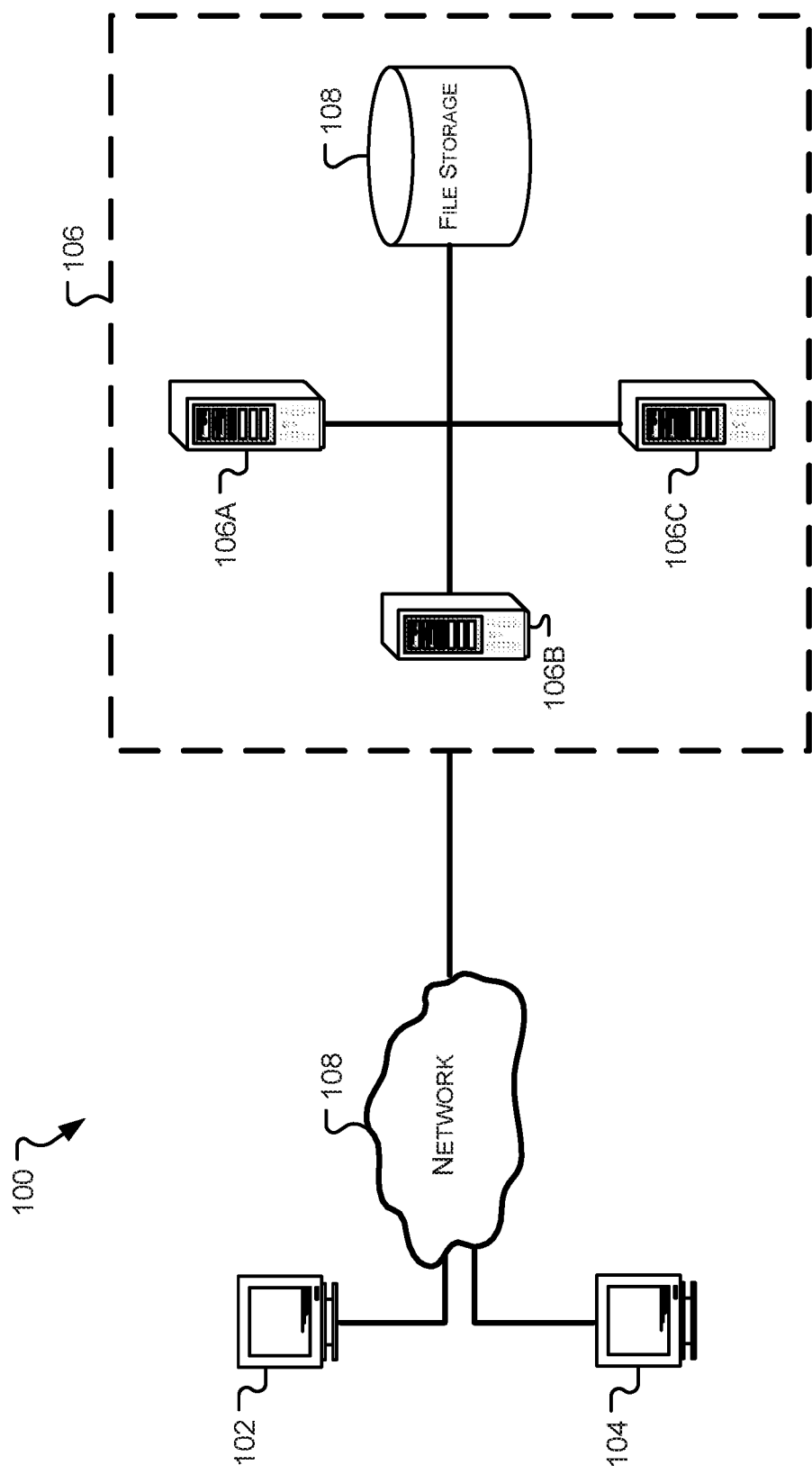
FIG. 1 illustrates a system that may be used to implement embodiments described herein.

FIG. 1 illustrates a system 100 that may be used to implement some of the embodiments disclosed herein. System 106 may be an example clustered system that contains one or more nodes. An example of a clustered system is a server cluster with one or more servers, as illustrated in FIG. 1. System 100 includes clients 102 and 104 and a server cluster 106. Clients 102 and 104 communicate with server cluster 106 through network 108. In embodiments, network 108 may be the Internet, a WAN, a LAN, or any other type of network known to the art. Server cluster 106 stores resources that are accessed by applications on clients 102 and 104. Clients 102 and 104 establish sessions with cluster 106 to access the resources on cluster 106. Although in FIG. 1 only clients 102 and 104 are shown as communicating with cluster 106, in other embodiments there may be more than two clients accessing information from server cluster 106. In embodiments, clients 102 and 104 may access or communicate with the server cluster 106 according to the SMB2 protocol.

As shown in FIG. 1 server cluster 106 includes one or more nodes, e.g., servers 106A, 106B, and 106C, which provide both high availability and redundancy for the information stored on cluster 106. The one or more nodes of server cluster 106 may communicate with each other via a network such as the Internet, a WAN, a LAN, or any other type of network known to the art. In embodiments, the cluster 106 may have a file system, a database, or other information that is accessed by clients 102 and 104. Although three servers are shown in FIG. 1, in other embodiments cluster 106 may include more than three servers, or fewer than three servers.

In embodiments, server cluster 106 is a scaled out server cluster. In embodiments, a scaled out server cluster includes a files system 108 that is accessible by each node in the server cluster (e.g., servers 106A, 106B, and 106C). As an example, in a scaled out cluster the file system is logically clustered such that the one or more disks that make up the file systems are visible from each server in the server cluster. In such embodiments, the scaled server cluster enables the sharing of resources across nodes in the cluster. In one such embodiment, the server cluster 106 includes a central data repository that includes one or more datastores that each server in server cluster 106 has access to. In such an embodiment, storing resources in the central repository allowing each server to access the file system. In another embodiment, a shared file system may be provided by replicating the resources across the local file systems of each server in the server cluster 106. In such embodiments, any manner of replicating data known to the art may be employed to replicate the cluster resources across the servers that make up the cluster.

The inclusion of a logically clustered file system in a scaled out server cluster, such as server cluster 106, provides additional functionality that is not available in a traditional server cluster. In one embodiment, the logically clustered file system ensures that each node that is part of the clustered environment can access any resource on the environment. In embodiments, a resource may be an application, a file, an object, data, or any other type of resource provided in a clustered environment. This allows a client to access and/or otherwise manipulate any resource on the file system regardless of which node (e.g., servers 106A, 106B, and/or 106C) the client establishes a connection to. In embodiments, file server 106 may register every node under a common name using a name resolution mechanic. A non-limiting example of a name resolution mechanic is the Domain Name System (DNS). For example, server cluster 106 may register servers 106A, 106B, and 106C under a common name in a DNS server (not shown in FIG. 1). The DNS server may be a part of the server cluster 106 or it may be external to server cluster 106.

When a client attempts to access a server in server cluster 106, the client may access the name resolution mechanics to obtain the address a server. For example, a client may contact a DNS server to obtain an address for a server in server cluster 106. Because the server system registered all servers under a common name, the DNS server may return a list of addresses for each server (e.g., servers 106A, 106B, and 106C) that make up server cluster 106. In embodiments, the address may be an IP address, a URL, a URI, or any other type of address known to the art. Because multiple addresses are returned, the client is provided with a choice of which server to connect to. In embodiments, the client may choose to connect to the first address in the list it receives from the server. In some instances, the client may have trouble connecting to the first server identified by the first address (e.g., server 106A). Because each server in server cluster 106 is capable of providing the client with similar functionality, the client may decide to connect to another server in server cluster 106. If the client is unable to successfully connect to the first server, after waiting a predetermined period of time, a client may issue one or more requests to connect to a subset of the addresses it received from the name resolution mechanic (e.g., server 106B and server 106C) and pick a connection that succeeds. The one or more requests may be made in parallel, in which case the client may connect to the first server with which a successful connection is established.

Although a specific ordering of the list of addresses was provided above (e.g., server 106A as the first listed address) one of skill in the art will appreciate that the list of addresses may be in any order. In embodiments, a round robin technique may be employed with by the name resolution mechanic, such as DNS round robin, may be leveraged to provide load balancing across the network. Because multiple clients (e.g., client 102 and 104) may simultaneously connect to server cluster 106, the round robin technique ensures that the first address provided to different clients changes. Thus, initial connection requests are spread across all nodes of the clustered environment. Furthermore, clients may randomly select the subset of addresses it issues additional correction request to after an unsuccessful attempt at connection with a first server, thereby providing an additional load balancing mechanism.

In embodiments, once a client is connected to a server in server cluster 106, the client may ensure that it remains connected to the same server. Although each server (e.g., servers 106A, 106B, and 106C) shares a logically clustered file system, the client's session state may be handled by the server it is connected to. Thus, in order to minimize state synchronization traffic across the servers, a client may ensure that it remains connected to the same server. For example, if client 102 is connected to server 106A, client 102 may attempt to ensure that all of its connections and resource usage (e.g., open files) are on server 106A. In such embodiments, if client 102 loses its connection to server 106A, it will attempt to reconnect to server 106A instead of servers 106B or 106C when it reconnects to server cluster 106, thereby reducing the need for transferring session state between different servers in server cluster 106. In embodiments, because a client attempts to reconnect to the same server upon losing a connection, the server may maintain the client's session state even after it loses communication with the client. For example, if client 102 loses connection with server 106A, server 106A may maintain the session state for client 102. When client 102 reestablishes its connection, the persistence of the session state allows the client 102 to reuse its session information (e.g., state information) upon reconnecting to server 106A.

However, in some circumstances, it may not be efficient or possible for the client to maintain its connection to a single server in server cluster 106. For example, a server node failure, lost connectivity to a given server, or an administrative action, such as, load balancing, patching of a server, or any other type of administrative action, may make it impossible for a client to reconnect to the same node. To facilitate the changing of nodes, server cluster 106 may support persistent handles to resources accessed by a client. The persistent handles allow client to resume handles it established on a first node when connecting to a second node. For example, if client 102 changes its initial connection from server 106A to server 106C, the handles used by client 102 on server 106A may be transferred to server 106C.

In embodiments, server cluster 106 may employ a persistent state store to provide persistent handles. An example persistent state store is a resume key manager that may be present in one or more nodes of server cluster 106. However, one of skill in the art will appreciate that any type of cache or datastore may be utilized by server cluster 106 to facilitate persistent handles. In one embodiment, server cluster 106 provides a centralized persistent state store. In such embodiments, a single node (e.g., server 106B) in server cluster 106 maintains the persistent state of open handles for a client session. In such embodiments, each time a client switches from one node to another (e.g., switching from server 106A to 106C), the ownership of the handles that are part of the clients session may be transferred between the nodes (e.g., ownership transferred from server 106A to server 106C) by employing a previous session invalidation logic, such as the invalidation techniques described in the commonly assigned co-pending U.S. patent application Ser. No. 13/228,732, entitled "Clustered Client Failover", filed on Sep. 9, 2011, which is hereby incorporated by reference in its entirety. In other embodiments, ownership of the handles may be transferred explicitly by the client on a handle by handle bases.

In another embodiment, the persistent state store may be a distributed state store. In such embodiments, the persistent state store may be distributed across the nodes of server cluster 106. In such embodiment, each node may store a persistent state store. A clusterwide state replication algorithm may be used to replicate state across the distributed state store. In such embodiments, server cluster 106 maintains state information in cases when a subset of nodes fails.

As discussed, each node of a scaled cluster is connected to a logically clustered file system. In order to avoid conflicts when multiple clients access the same resource, the server cluster 106 may perform distributed state resolution by providing the ability for one or more node (e.g., 106A, 106B, and/or 106C) to take oplocks or a lease on a resource. In embodiments, shared readers may be supported by using RH oplocks, which allow multiple readers to access the same file on multiple nodes of a cluster. In further embodiments, write locks may also be supported by server cluster 106.

As described herein, one of skill in the art will appreciate that a scaled server clusters provide additional functionality that is not available in a non-scaled server cluster. Although specific examples of the additional functionality have been provided with respect to FIG. 1, one of skill in the art will appreciate that these are non-limiting examples of the benefits and functionality provided by a scaled server cluster.

Figure 2:
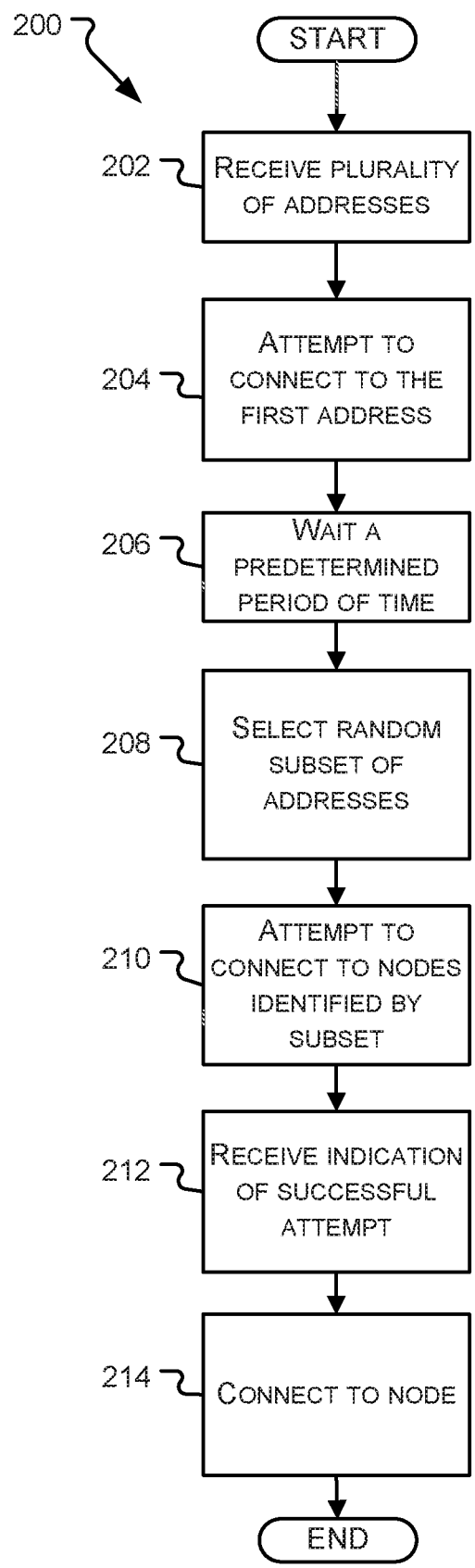
FIG. 2 is an embodiment of a method that a client may perform when connecting to a server cluster.

FIG. 2 is an embodiment of a method 200 that a client may perform when connecting to a clustered environment. For example, a client such as client 102 (FIG. 1) may employ method 200 to determine which node (e.g., 106A, 106B, and/or 106C) to establish a connection with when connecting to a clustered environment. Flow begins at operation 202 where the client receives a list of addresses from a name resolution mechanism, such as a DNS server. As discussed with respect to FIG. 1, in embodiments, each node in the clustered environment may be capable of providing similar functionality to the client. Thus, the client may successfully perform a desired operation or access a desired resource in the clustered environment regardless of which node the client connects to.

Flow continues to operation 204, where the client attempts to connect to a first node identified by a first address in the list of addresses received at operation 202. A client may attempt to connect to the first node by sending an initial connection request to the node identified by the first address at operation 204. However, one of skill in the art will appreciate that any manner of attempting a connection with a node (e.g., a server) at operation 203. In embodiments, the client may wait a predetermined period of time, as indicated by operation 206, for the first attempt to succeed. However, because any node in the clustered environment is capable of accessing any resource on the client's behalf, the client may issue attempt requests to other server clusters if the first attempt fails or is taking a long time. While operation 206 describes the client waiting a predetermined period of time, the time may also be dynamically determined by the client.

In another embodiment, the first attempt to connect to the server may be successful, however, the node may not have access to the resources of the clustered environment. For example, the list of addresses may contain an incorrect address or the address of a node that is no longer a part of the clustered environment. In a further embodiment, an error may prohibit the node from accessing the clustered environments resources. The client may employ logic necessary to identify such situations. In these situations, the client may treat the successful attempt as a failure and continue performing method 200.

Upon failure of the first attempt or after expiration of the period of time, flow continues to operation 208 where the client randomly selects a subset of addresses from the list of addresses. In embodiments, random selection of the subset addresses provides load balancing benefits to the clustered environment, which may have multiple clients attempting to connect to its nodes at a single time. If each client randomly selects a subset of nodes to connect to, a better balance of connections may be established across the clustered environment. In other embodiments, however, the client may not select a random subset but may select addresses in the order they appear on the list. In further embodiments, instead of selecting a subset of list of addresses at operation 208, the client may select all addresses in the list.

Flow continues to operation 210 where the client attempts to connect to one or more nodes identified by the addresses in the selected subset. In one embodiment, the client may attempt to connect to multiple nodes in parallel at operation 210, thereby speeding up the connection process. In embodiments, the client may send one or more additional connection requests different nodes at operation 210, however, as described with respect to operation 204, any manner of attempting to connect may be employed with the embodiments described herein.

Flow continues to operation 212, where the client receives an indication of a successful connection. In embodiments, the indication may be a message that the client receives from a node indicating that the client is able to connect to the node. In embodiments, if the client makes parallel attempts at operation 210, the client may decide to connect to the first node that successfully responds to the client at operation 212. In other embodiments, the client may receive multiple indications of successful attempts from different nodes in the clustered environment. In such embodiments, the client may choose which node to connect to. In further embodiments, the indications may provide performance about the node, such as the node's current load. The client may use such information to determine which node to establish a connection to. For example, the client may choose to connect to a node with a lighter load, a specific hardware configuration, etc. Once the client has selected a node, flow proceeds to operation 214 and the client connects to the node.

After the client connects to the node, the client establishes a session with the node and is capable of accessing resources in the clustered environment. As described with respect to FIG. 1, once a client establishes a connection to a node, the client attempts to maintain its connection with the same node. This reduces the transmittal of state information that may take place when a client transfers connections from one node to another. In such embodiments, if the client disconnects from the node, for example, due to an error such as a network failure or the client crashing, the client may attempt to reconnect to the same node after recovering from the error.

Figure 3:
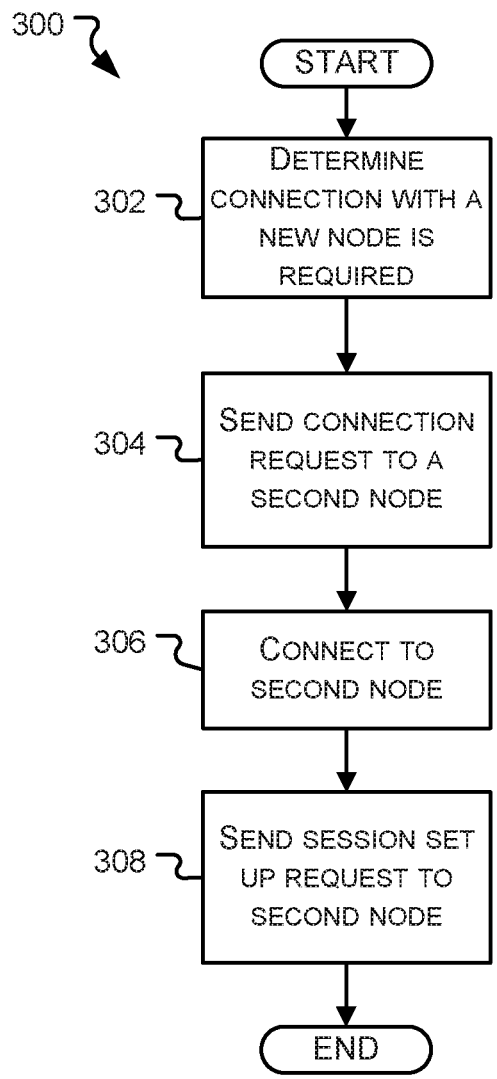
FIG. 3 is an embodiment of a method that a client may perform when transferring connections between nodes in a clustered environment.

However, it may not always be possible for the client to reconnect to the same node. For example, if the node fails, if a client loses connectivity with the node, or if the node is unavailable for an administrative purpose (e.g., due to load balancing requirements, patching of the node, etc.) the client may reestablish its connection to the clustered environment via a different node. FIG. 3 is an embodiment of a method 300 that a client may perform when transferring connections between nodes in a clustered environment.

Flow begins at operation 302 where the client determines that a connection with a new node is required. For example, upon losing connection with a node due to a network or node failure, the client may determine that it cannot reconnect to the same node in the clustered environment. In another embodiment, the client may receive performance information from the node. Based upon the performance information, the client may decide to transfer connection to another node that can provide better service to the client. For example, the client may receive information indicating that the node is experiencing heavy traffic. In such situations, the client may not be required to reconnect to another node, but may optionally decide to do so for performance reasons. Similarly, the client may determine this information on its own without receiving performance information from the node, for example, by monitoring how long it takes the node to perform a request.

In another embodiment, the node may require that the client transfer its connection to a different node in the cluster. For example, if the node is about to be brought offline for a patch or for load balancing purposes, the node may require the client to transfer its connection to a different node. In such embodiments, the node may transmit a message to the client that indicates the client must transfer its connection. Embodiments of performing such communications are described in the commonly assigned, commonly assigned copending patent application entitled "Providing a Witness Service" (U.S. patent application Ser. No. 13/074,920) filed on Mar. 29, 2011, which is hereby incorporated by reference in its entirety.

After determining that a transfer of connection between nodes is required, flow continues to operation 304. At operation 304, the client attempts to connect to a different node in the clustered environment. For example, the client may send a connection request to one or more nodes in the clustered environment. In embodiments, the client may connect to a second node in the clustered environment by performing all or a subset of the steps described with respect to method 200. In another embodiment, the client may be directed to connect to a specific node by the clustered environment. Upon a successful attempt, flow continues to operation 306 and the client connects to a second node in the clustered environment.

However, because the client had a previously established session, the session may be transferred to the different node. At operation 308, the client sends a session set up request to the second node. In embodiments, the session set up request may be a message containing a session identifier that identifies the clients previously established connection. As will be discussed further with respect to FIG. 5, in response to receiving the session set up request, the second node may take ownership of the previously established connection. While the method 300 describes sending a session set up request as a discreet step, one of skill in the art will appreciate that a client may send a session set up request or a session identifier with a request to connect to the second node at operation 304.

Figure 4:
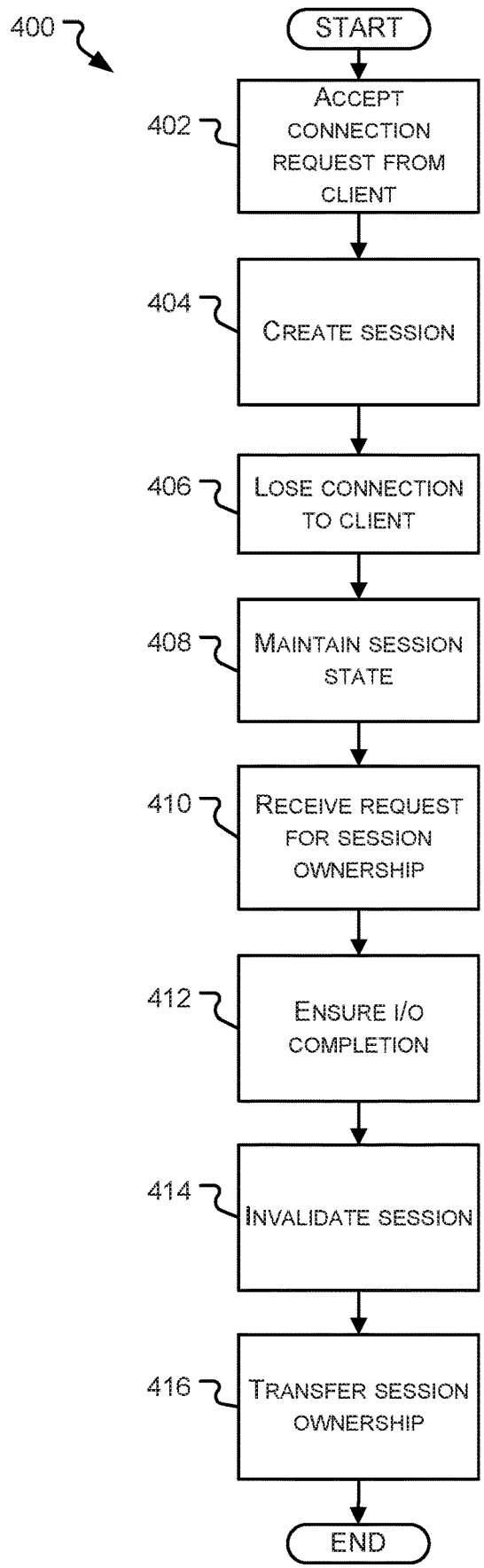
FIG. 4 is an embodiment of a method performed by a node in a clustered environment to maintain and transfer persistent handles.

Having now described methods that a client may employ when connecting to a scaled out clustered environment, the present disclosure will now describe the functionality that may be employed by one or more nodes in such an environment. FIG. 4 is an embodiment of a method 400 performed by a node in a clustered environment to maintain and transfer persistent handles in a clustered server environment. For example, the method 400 may be performed by a server, such as servers 106A, 106B, and 106C, which is part of a clustered server environment (e.g., server cluster 106). Flow begins at operation 402 where the accepts a connection request from a client thereby establishing a connection between the node and the client. The initial connection indicates that the client does not have a previously established on the node or on another node in the clustered environment. In embodiments, the node may determine that it is establishing a connection with the client when it does not receive a session set up request from the client as a part of the client's connection request or shortly after establishing the connection to the client.

Flow continues to operation 404 where the node creates a session with the client. At operation 404, the node may assign a session identifier to the session. The session identifier may be a globally unique identifier (GUID) across all nodes in the clustered environment. Upon creating the session, the node may allocate resources and/or perform operation on resources on the client's behalf. In doing so, session information, such as, for example, state information, may be created. The node may store the session information. In addition to the state information, the node may store one or more handles. For example, if a client opens a file, a handle to the file may be provided to the client. The node may store handles along with, or in addition to, the session information.

Flow continues to operation 406 where the node loses its connectivity to the client. For example, the client may suffer an error (e.g., a crash or loss of network connection). In anticipation that the client may reconnect, the server will maintain the session and/or information at operation 408. For example, the node may write the session and/or state information to local memory, to a centralized persistent store, or to a distributed state store. As earlier described, a client will attempt to maintain a connection with a single node. In embodiments, after the client recovers from the error, the client may reconnect to the node. Upon reconnection, the node may identify that the client had a previously established state, for example, by receiving a session identifier from the client. In such embodiments, the maintained session state allows the client to continue its previously established session.

However, in certain circumstances, the client may not be able to reconnect to the node. Instead, the client may reconnect to a different node in the clustered environment. Under such circumstances, flow continues to operation 410 where the node receives a request to transfer session information from another node in the clustered environment. In embodiments, another node requests ownership of the session information in order to reestablish the session for the client, which is now connected to the node requesting ownership. The request for session ownership may include a session identifier that the node performing the method 400 may use to identify the previously established session that it owns and/or maintains.

Upon receiving the request for session ownership, flow continues to operation 412 where the node ensure that there are no outstanding input/output (I/O) operations being performed on resources associated with the previously established session. In embodiments, if there are outstanding I/O operations, the node waits for the operations to complete before proceeding to operation 414. In other embodiments, the node may cancel pending I/O operations on the session resources at operation 410. The node may wait for and/or cancel pending I/O operations maintains resource integrity.

After the node ensures that all I/O are completed (or cancelled), flow continues to operation 414. At operation 414, the node invalidates the previous established session. Invalidating the session may comprise closing any open handles that are a part of the session. In other embodiments, invalidating the session may include releasing any locks that may be on the resource. In embodiments, invalidation of the session may also include the invalidation logic described with respect to FIG. 1. Furthermore, in embodiments, single step invalidation may be performed in which the node invalidates all handles and/or locks for the previously established session to eliminate the need for the node to individually invalidate each file handles.

After the previously establish session is invalidated, flow continues to operation 416 where the node transfers ownership of the session to the requesting node. In embodiments, transfer of ownership of the session may include transferring ownership of all associated resources related to the session. An example resource that may be transferred at operation 416 is a file handle; however, the ownership of other resources may also be transferred at operation 416. In further embodiments, transferring ownership of the resources related to the session may include the transfer of the resource from one node to another. For the sake of efficiency, all session information may be transferred in bulk at operation 416, thereby reducing the number of communications required between the nodes.

Figure 5:
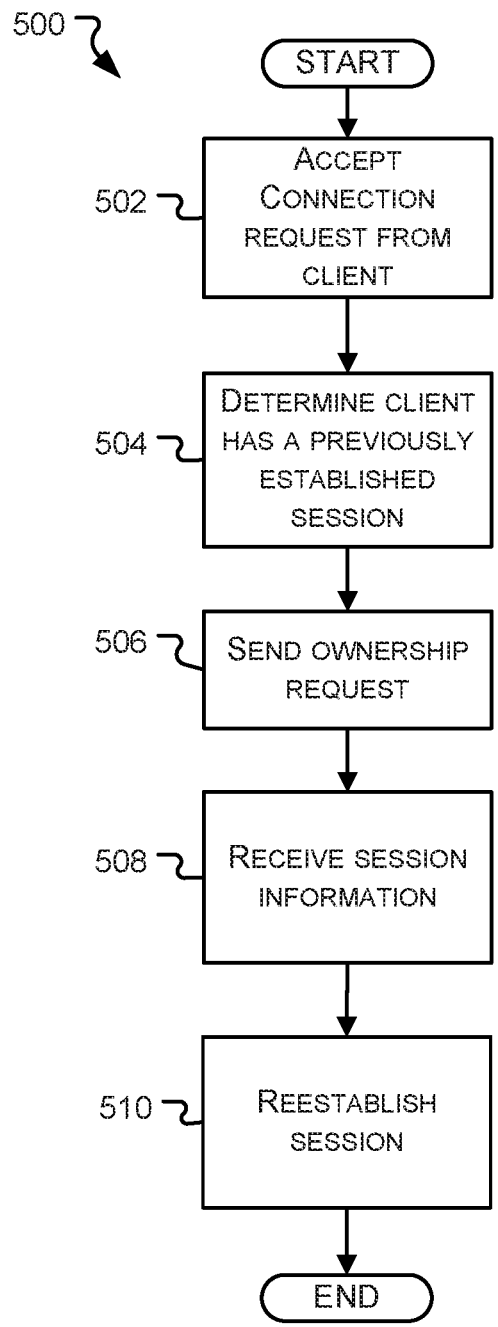
FIG. 5 is an embodiment of a method performed by a node in a clustered environment to request ownership of a previously established session.

FIG. 5 is an embodiment of a method 500 performed by a node in a clustered environment to request ownership of a previously established session. For example, the method 400 may be performed by a server, such as servers 106A, 106B, and 106C, which is part of a clustered server environment (e.g., server cluster 106). Flow begins at operation 502 where the node establishes a connection with a client. For example, the node may receive a request for a connection request from the client at operation 502. The node may accept the connection request and connect to the client.

Flow continues to operation 504 where the node identifies that the client previously established a session with another node in the clustered environment. In embodiments, the node may receive a session set up request from the client. The session set up request may be received with a connection request or after connecting to the client. In embodiments, the session set up request contains a session identifier that identifies the previously established connection.

Flow continues to operation 506 where the node sends an ownership request to a second node in the clustered environment that currently owns the client's previously established session. The ownership request may contain instructions to invalidate the handles associated with the previous session and transfer session information to the node. In embodiments, the ownership request may include a session set up request and/or a session id received at operation 504.

Flow continues to operation 508 where the node receives session and/or state information for the previously established session. In embodiments, the session and/or state information may be received from the second node, from a central repository, or from another location within the clustered environment. In another embodiment, rather than receiving the session and/or state information at operation 508, the node may be permitted to access session and/or state information that reside in a centralized repository at operation 508. Flow then continues to operation 510 where the node uses the received and/or accessed session or state information to reestablish the client's session and allow the client to continue accessing resources in the clustered environment.

Methods 300-500 are merely some examples of operational flows that may be performed in accordance with embodiments. Embodiments are not limited to the specific description provided above with respect to FIGS. 3-5 and may include additional operations. Further, operational steps depicted may be combined into other steps and/or rearranged. Further, fewer or additional steps may be used, employed with the methods described in FIGS. 3-5.

Figure 6:
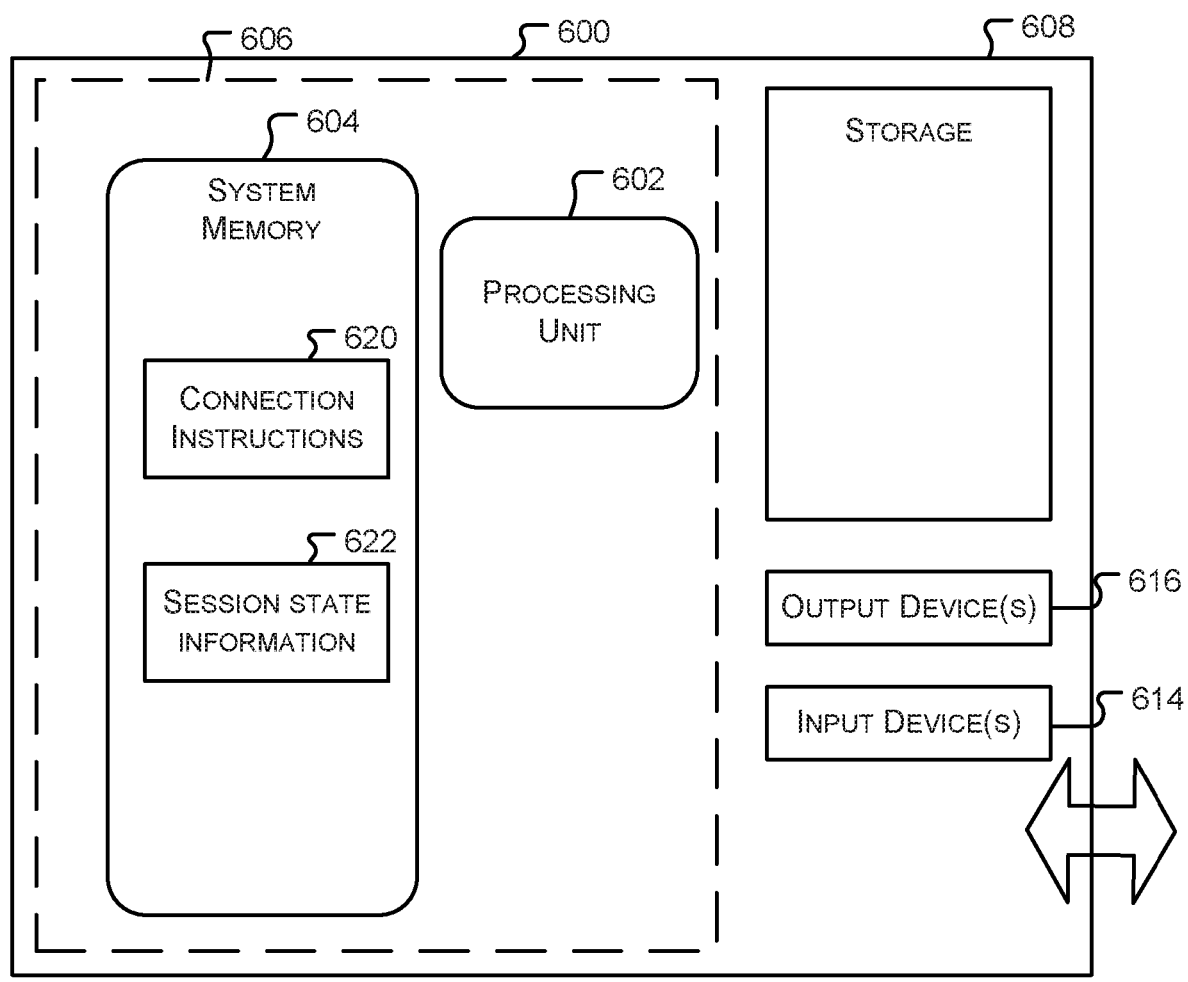
FIG. 6 illustrates a block diagram of a computing environment suitable for implementing embodiments.

FIG. 6 illustrates a general computer system 600, which can be used to implement the embodiments described herein. The computer system 600 is only one example of a computing environment and is not intended to suggest any limitation as to the scope of use or functionality of the computer and network architectures. Neither should the computer system 600 be interpreted as having any dependency or requirement relating to any one or combination of components illustrated in the example computer system 600. In embodiments, system 600 may be used as the clients and/or servers described above with respect to FIG. 1.

In its most basic configuration, system 600 typically includes at least one processing unit 602 and memory 604. Depending on the exact configuration and type of computing device, memory 604 may be volatile (such as RAM), non-volatile (such as ROM, flash memory, etc.) or some combination. This most basic configuration is illustrated in FIG. 6 by dashed line 606. System memory 604 stores instructions 620 such as the instructions to connect to a scaled cluster environment methods disclosed herein and data 622 such as session state information that may be stored in a file storage system with storage such as storage 608.

The term computer readable media as used herein may include computer storage media. Computer storage media may include volatile and nonvolatile, removable and non-removable media implemented in any method or technology for storage of information, such as computer readable instructions, data structures, program modules, or other data. System memory 604, removable storage, and non-removable storage 608 are all computer storage media examples (e.g. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 614 such as a keyboard, a mouse, a pen, a sound input device, a touch input device, etc. Output device(s) 616 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing continuous access to a resource may operate via application-specific logic integrated with other components of the computing device/system 600 on the single integrated circuit (chip).

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

We claim:

1. A method for establishing a session with a clustered server environment, the method comprising:
receiving, at a client, a plurality of addresses, wherein each address of the plurality of addresses identifies a server in the clustered server environment;
sending, from the client, a first request to connect to a first server identified by a first address of the plurality of addresses;
prior to connecting to the first server:
randomly selecting, by the client, a subset of addresses from the plurality of addresses, the subset of addresses comprising a second address identifying a second server; and
sending, from the client, a second request to connect to the second server, wherein the second server is different from the first server;
receiving, from the second server in response to the second request, a first indication of success;
based on the first indication of success, connecting to the second server;
receiving, at the client, a session identifier from the second server;
accessing, by the client via the second server, at least one resource of the clustered environment using the session identifier;
determining, by the client, that a new connection is needed;
sending, by the client, the session identifier to a third address of the plurality of addresses, wherein the third address identifies a third server that is different from the first server and the second server; and
accessing, by the client via the third server, the at least one resource of the clustered environment using the session identifier.

2. The method of claim 1, further comprising:
receiving, from the first server in response to the first request, a second indication of success comprising a first load indication for the first server.

3. The method of claim 2, wherein the first indication of success comprises a second load indication for the second server and further comprising:
comparing the first load indication and the second load indication to determine the second server has a lighter load than the first server.

4. The method of claim 1, wherein the first address and the second address are randomly selected from the plurality of addresses.

5. The method of claim 1, wherein the second request is sent a predetermined period of time after sending the first request.

6. The method of claim 1, wherein the plurality of addresses are received from a name resolution service.

7. The method of claim 6, wherein the name resolution service comprises a domain name system server.

8. The method of claim 1, wherein:
determining, by the client, that a new connection is needed comprises receiving a status message from the second server related to server performance.

9. A computer memory encoding computer-executable instructions that, when executed by at least one processor, cause the at least one processor to perform a set of operations for establishing a session with a clustered server environment, the set of operations comprising:
receiving a plurality of addresses, wherein each address identifies a server in the clustered server environment;
sending a first request to connect to a first server identified by a first address of the plurality of addresses;
prior to connecting to the first server:
randomly selecting a subset of addresses from the plurality of addresses, the subset of addresses comprising a second address identifying a second server and a third address identifying a third server;
sending a second request to connect to the second server, wherein the second server is different from the first server; and
sending a third request to connect to the third server, wherein the third server is different from the first server and the second server;
receiving, from the first server in response to the first request, a first indication of success;

receiving, from the second server in response to the second request, a second indication of success;

determining, based at least in part on the first indication and the second indication, to connect to the second server;

connecting to the second server instead of the first server;

receiving, at the client, a session identifier from the second server;

accessing, by the client via the second server, at least one resource of the clustered environment using the session identifier;

determining, by the client, that a new connection is needed;

sending, by the client, the session identifier to a fourth address of the plurality of addresses, wherein the fourth address identifies a fourth server that is different from the first server and the second server; and accessing, by the client via the fourth server, the at least one resource of the clustered environment using the session identifier.

10. The computer memory of claim 9, wherein:

the first indication of success comprises a first load indication for the first server;

the second indication of success comprises a second load indication for the second server; and determining to connect to the second server comprises comparing the first load indication and the second load indication to determine the second server has a lighter load than the first server.

11. The computer memory of claim 9, wherein the second request is sent a predetermined period of time after sending the first request.

12. The computer memory of claim 9, wherein:

determining, by the client, that a new connection is needed comprises receiving a status message from the second server related to server performance.

13. A system comprising:

at least one processor; and memory, operatively connected to the at least one processor and storing instructions that, when executed by the at least one processor, cause the system to perform a set of operations, the set of operations comprising:

receiving, at a client, a plurality of addresses, wherein each address of the plurality of addresses identifies a server in the clustered server environment;

sending, from the client, a first request to connect to a first server identified by a first address of the plurality of addresses;

prior to connecting to the first server:

randomly selecting, by the client, a subset of addresses from the plurality of addresses, the subset of addresses comprising a second address identifying a second server; and sending, from the client, a second request to connect to the second server, wherein the second server is different from the first server;

receiving, from the second server in response to the second request, a first indication of success;

based on the first indication of success, connecting to the second server;

receiving, at the client, a session identifier from the second server;

accessing, by the client via the second server, at least one resource of the clustered environment using the session identifier;

determining, by the client, that a new connection is needed;

sending, by the client, the session identifier to a third address of the plurality of addresses, wherein the third address identifies a third server that is different from the first server and the second server; and accessing, by the client via the third server, the at least one resource of the clustered environment using the session identifier.

14. The system of claim 13, wherein the set of operations further comprises:

receiving, from the first server in response to the first request, a second indication of success comprising a first load indication for the first server.

15. The system of claim 14, wherein the first indication of success comprises a second load indication for the second server and the set of operations further comprises:

comparing the first load indication and the second load indication to determine the second server has a lighter load than the first server.

16. The system of claim 13, wherein the first address and the second address are randomly selected from the plurality of addresses.

17. The system of claim 13, wherein the second request is sent a predetermined period of time after sending the first request.

18. The system of claim 13, wherein the plurality of addresses are received from a domain name system server.

19. The system of claim 13, wherein:

determining, by the client, that a new connection is needed comprises receiving a status message from the second server related to server performance.

* * * * *